United States Patent [19]

Adams et al.

[11] Patent Number: 5,913,920

[45] Date of Patent: Jun. 22, 1999

[54] INDICATING UPDATES FROM A REMOTE DISPLAY

[75] Inventors: Paul Stuart Adams, London; Benedict Daniel Gladwyn, Uxbridge; Vincent Joseph Singleton, Daventry, all of United Kingdom

[73] Assignee: International Business Machines Corporation, Armonk, N.Y.

[21] Appl. No.: 08/672,204

[22] Filed: Jun. 27, 1996

Related U.S. Application Data

[63] Continuation of application No. PCT/GB95/01998, Aug. 23, 1995.

[30] Foreign Application Priority Data

Dec. 13, 1994 [GB] United Kingdom .................... 9425142

[51] Int. Cl.⁶ ............................................. H04L 12/18
[52] U.S. Cl. .................................... 709/204; 345/330
[58] Field of Search .................... 395/200.04, 200.08, 395/200.09, 330, 331, 332, 200.34, 200.35, 200.36, 200.37, 200.43, 200.47; 345/330, 331, 332

[56] References Cited

U.S. PATENT DOCUMENTS

| | | | |
|---|---|---|---|
| 4,974,173 | 11/1990 | Stefik et al. ............................. | 395/331 |
| 5,337,407 | 8/1994 | Bates et al. ............................. | 395/331 |
| 5,339,388 | 8/1994 | Bates et al. ............................. | 395/331 |
| 5,339,389 | 8/1994 | Bates et al. ............................. | 395/331 |
| 5,347,632 | 9/1994 | Filepp et al. ......................... | 395/200.09 |
| 5,442,771 | 8/1995 | Filepp et al. ......................... | 395/200.08 |

FOREIGN PATENT DOCUMENTS

| | | |
|---|---|---|
| 0475581 | 8/1991 | European Pat. Off. . |
| 0590817 | 9/1993 | European Pat. Off. . |
| 8912859 | 12/1989 | WIPO . |
| 9109378 | 6/1991 | WIPO . |
| WO 96/18943 | 6/1996 | WIPO . |

OTHER PUBLICATIONS

Baldwin et al., A Design for Multimedia Desk to Desk Conferencing, IEEE, 1993, pp. 160–166.
Vetter, Ronald Jr., Mosaic and the World Wide Web, pp. 49–57, IEEE, 1994.
UK Patent Application GB–2185837, filed Jan. 29, 1986, by Christopher Harding Moller, "Remote User Interface".
"Video Conferencing is Virtual Face–to–Face", p. 240(2), Dialog Record 01724115 of PC Computing, 8, N2, Feb. 1995.

*Primary Examiner*—Richard L. Ellis
*Assistant Examiner*—Patrice L. Winder
*Attorney, Agent, or Firm*—Jeanine S. Ray-Yarletts

[57] ABSTRACT

Two computer workstations are connected together by a communications link 300. One workstation (the local workstation) 100 includes a window 610 which is used to display a copy of what is currently being displayed on the screen of the other (remote) workstation 200. Each time an update is made to the screen of the remote workstation, it must be transmitted to the local workstation. A bounding rectangle 920 for the area of the screen changed by the update is determined. If the bounding rectangle is greater than a predetermined size, then a first packet is transmitted from the remote workstation to the local workstation, prior to the transmission of the actual update itself. This first packet indicates the bounding rectangle for the updated area of screen. The local workstation responds to the first packet by greying (shading) the corresponding region 925 of the window which contains the copy of the remote screen, thereby indicating to a user of the local screen that an update is imminent.

18 Claims, 6 Drawing Sheets

INDICATING UPDATES FROM A REMOTE DISPLAY

This application claims continuation on PCT application PCT/GB95/01998 filed on Aug. 23, 1995. The present invention relates to systems in which an update made to the screen of a first computer workstation is transmitted to a second computer workstation, so that a copy of the update can be displayed on the screen of the second computer workstation.

BACKGROUND OF THE INVENTION

In recent years it has become increasing popular to link computer workstations together, for example in local area networks (LANs) or by Integrated Services Digital Network (ISDN) connections, in order to allow the computer workstations to exchange data. This has given rise to a new field of computer technology, often referred to generically as collaborative working. Two particular examples of collaborative working are application sharing, and remote control. In the former, an application runs at two machines, with updates made to the application at either machine being transmitted to and mirrored on the other machine. Clearly this technique can be extended to more than two machines. In remote control, applications running at one machine are effectively controlled by a user at another machine. Examples of collaborative working systems can be found in EPA 475581 and WO 89/12859.

One problem in collaborative working can be the slow reponse time, due to the need to transmit data over a communications link. This can be particular frustrating for example in remote control, when a user of the local machine performs some action, such as clicking a mouse button, but does not see any immediate response due to the time required to communicate with the machine that is being controlled remotely. During this delay, the user may mistakenly imagine that their mouse action was not accepted by the system, and repeat the action. However, this will eventually result in the action being performed twice, quite contrary to the original intention.

It is of course known in conventional standalone workstations to provide some indication that the machine is processing data. For example, in the OS/2 operating system available from IBM Corporation, the cursor changes to a clock shape to indicate that the system is currently performing the requested action. Alternatively, a textual message may be displayed, again stating that the requested action is in progress.

It is also known in relation to the World Wide Web for a client terminal to retrieve information from a remote server, which provides pages of information having a predetermined HTML format. A page may contain a reference to a separate graphics file, representing an image to be included on that page. When the client retrieves such a page, it then knows to access the graphics file in order to retrieve the image. The client may request the server to provide header information first for the image, before the image itself, so that the client can determine the particular region of screen in which to locate the image. The client can then write the text for the page to the screen, leaving a box or area for the image to be filled in subsequently once the image data itself has been retrieved. This approach requires the explicit support of both the client and server, and is fundamentally driven by the client (ie receiving) terminal. It is not directly applicable to a collaborative working environment.

"Beyond the Chalkboard: Computer Support for Collaboration and Problem Solving in Meetings" by M Stefik, G Foster, D Bobrow, K Kahn, S Lanning, and L Suchman, p32–47 in Computing Practices, Communications of the ACM, Vol 30, NUmber 1, January 1987, describes a collaborative working system (although it does not mention remote control). To overcome the problem that more than one user may try to simultaneously edit a shared object, an item which one user is currently working on is greyed out. This approach requires specifically adapted applications (eg to monitor which items are being edited). However, an important objective for more recent collaborative working systems is that they should be able to work with existing (standalone) applications (for example, to provide remote control).

SUMMARY OF THE INVENTION

Accordingly, the invention provides a method of operating a remote computer workstation having a display screen, said remote workstation being linked to a local workstation, the method comprising the steps of:

generating an update to the remote workstation screen;

determining the region of the remote workstation screen which is being updated;

transmitting an indication of the region being updated to the local workstation;

and separately transmitting to the local workstation the data representing the update.

Correspondingly, the invention also provides a method of operating a local computer workstation, said local workstation being linked to a remote workstation, in which at least part of the screen of said local workstation is arranged to correspond to at least part of the screen of said remote workstation, the method comprising the steps of:

receiving a first message from the remote workstation indicating a region of the screen of the remote workstation to which an update is being applied;

denoting visually a region of the local workstation screen, said denoted region corresponding to the part of remote workstation screen to which said update is being applied;

receiving a second message from the remote workstation containing the update made to the remote workstation;

and applying said update at said local workstation to said denoted region of the screen.

Thus in situations in which an update being made at one computer (the remote workstation) is to be mirrored (ie also displayed) on the screen of another computer (the local workstation), the invention recognises that it is important to provide the user of the local workstation with an indication that the update is being processed and transmitted. This is because the delay between originally making the update and being able to display it at the local workstation may be significant, due to the time required for processing and transmitting the update, thereby making it difficult for the user at the local workstation to perform correct control operations. In accordance with the invention therefore, prior to the transmission of the actual update itself, a message containing an indication of the screen region affected by the update is transmitted from the remote workstation to the local workstation. Because the message contains only an indication of the updated area, rather than the update data itself, this update area message is relatively small, and so can be processed and transmitted much more quickly than the update data itself. Indeed, it is convenient to represent the update area in terms of a bounding rectangle for the area, so that the indication of the updated area can be provided by just two pairs of coordinates (eg for the top left and bottom right hand corners).

The indication of update area is then used to visually denote on the screen at the local workstation the region to which the impending update is to be applied. Note that this involves actually marking the region to be updated. This has several advantages, firstly there is no need to explicitly delete the marking later, since it is automatically overwritten when the update itself is subsequently applied. Secondly, it allows the user to see the size of the impending update, and therefore make a rough estimate of the expected delay before the update itself is received (since updates for larger areas will obviously tend to take longer to process and transmit). It also provides the user with some information about the nature of the impending update (eg the user can immediately see which parts of the screen the update will not affect).

Note that by requiring the additional message containing the update area to be transmitted, the method of the invention will actually slightly increase the delay in sending the update itself. However, in practice the disadvantage caused by this extra delay is more than compensated for by the early information about the update area which is made quickly available to the user at the local workstation, and which significantly enhances their ability to perform accurate control operations. The only exception to this is when the update can be processed and transmitted very quickly, so that the update itself would be received almost as quickly as the message indicating the update area. In this regard, it should be noted that the smaller the update, the proportionately greater the increase in transmission and processing requirements attributable to the update area message, since the size of the update area message is generally independent of the extent of the update itself (although this is never a particularly large effect).

Thus in a preferred embodiment, the method further comprises the step of comparing an update against predetermined criteria, whereby if such criteria are met, the update is transmitted directly, without the prior transmission of an indication of the updated region. The updated criteria relate to the speed with which the update can be processed and transmitted to the local workstation. If this can be done very quickly, then there is relatively little advantage in sending the update area message (indeed as explained above it might actually represent a slight disadvantage).

Typically the predetermined criteria relate to the size of updated region, ie the number of updated pixels. In the current implementation, an update area message is sent if the number of pixels being updated exceeds a fixed theshhold. This simple test is effective because clearly larger updates will generally take longer to transmit, and longer to process at both the remote and local workstations. However, it is easy to envisage enhancements to this approach, whereby the threshhold might for example be varied according to the bandwidth of the communication link between the local and remote workstations, and the current volume of traffic on the link, or according to processor loading. One possibility might be to periodically measure the delay between the production of an update at the remote workstation, and its display at the local workstation, and alter the threshhold accordingly. Another factor which might for example also be included in the predetermined criteria is the effectiveness of the data compression (if any) to be performed on the update data, since this will also affect the processing and transmission times.

One way to improve the efficiency of handling the very small update area messages is to transmit the indications of the updated region for multiple updates in a single message. This is beneficial since most communications systems have a degree of fixed overheads per message, so that sending several very small update area messages individually is relatively inefficient. Combining the indications of areas for several updates into a single message can therefore help system and network performance, whilst only adding minimal delay (if any) to the ultimate arrival of the update area information at the local workstation.

It is preferred that the step of visually denoting a region does not prevent the original image (ie text, picture, or whatever) at that region from remaining substantially visible, so that it stays discernible to the user until being overwritten when the update itself arrives. A quick and efficient way of doing this is to grey out (cross-hatch) the relevant region, although many other alternatives might also be used (eg striping, altering the background colour of the relevant region, or surrounding the relevant region by a coloured frame).

The present invention is particularly beneficial in situations in which a command is initially received at the remote workstation from the user at the local workstation, and the update is generated as a result of this command. This is because the user at the local workstation may become impatient if there is a delay in seeing a response to the command, and uncertain whether or not the command has been accepted. This can lead to the user repeating the command, which may have unexpected (and unwanted) consequences. This problem is avoided by sending the update area message, since this allows a visible response to be rapidly displayed to the user at the local workstation, who is thereby reassured that their command is being actively processed. In fact the user knows that the update has already been generated in response to the command (ie the command has been accepted, transmitted, and acted upon to generate the update). Moreover, as mentioned above, the size of the indicated area allows the user to roughly estimate the time until the update itself can be processed and transmitted for display at the local workstation. The indicated area also informs the user of course of the region of the screen that is being changed as a result of their command.

Progressing now to consider the local and remote workstations together, it can be seen that the invention also provides a method of mirroring at least part of a display screen from a remote workstation on a display screen of a local workstation, whereby updates applied to the screen of the remote workstation are correspondingly applied to the local workstation, said method comprising the steps of:

applying an update to the screen of the remote workstation;

determining the region of the remote workstation screen which is being updated;

transmitting an indication of the region being updated from the remote workstation to the local workstation;

receiving said indication at the local workstation;

denoting visually a region of the local workstation screen, said denoted region corresponding to the indicated region of the remote workstation screen to which said updated has been applied;

separately transmitting from the remote workstation to the local workstation the data representing the update applied to the screen;

receiving said update at the local workstation; and applying said update to said denoted region of the screen at the local workstation.

Note also that the invention is not limited to systems having only two workstations, but is equally applicable to systems where the original update is copied to multiple other screens. In such cases, the indication of update area will generally be provided to all the multiple other screens, although possibly if the links to some terminals are much slower than the links to other terminals, it might be sensible for only those terminals connected by the slow links to receive the update area message prior to the actual update itself.

The invention further provides apparatus for implementing the above methods.

BRIEF DESCRIPTION OF THE DRAWINGS

An embodiment of the invention will now be described in detail by way of example only with reference to the following drawings.

DETAILED DESCRIPTION OF THE INVENTION

Figure 1:
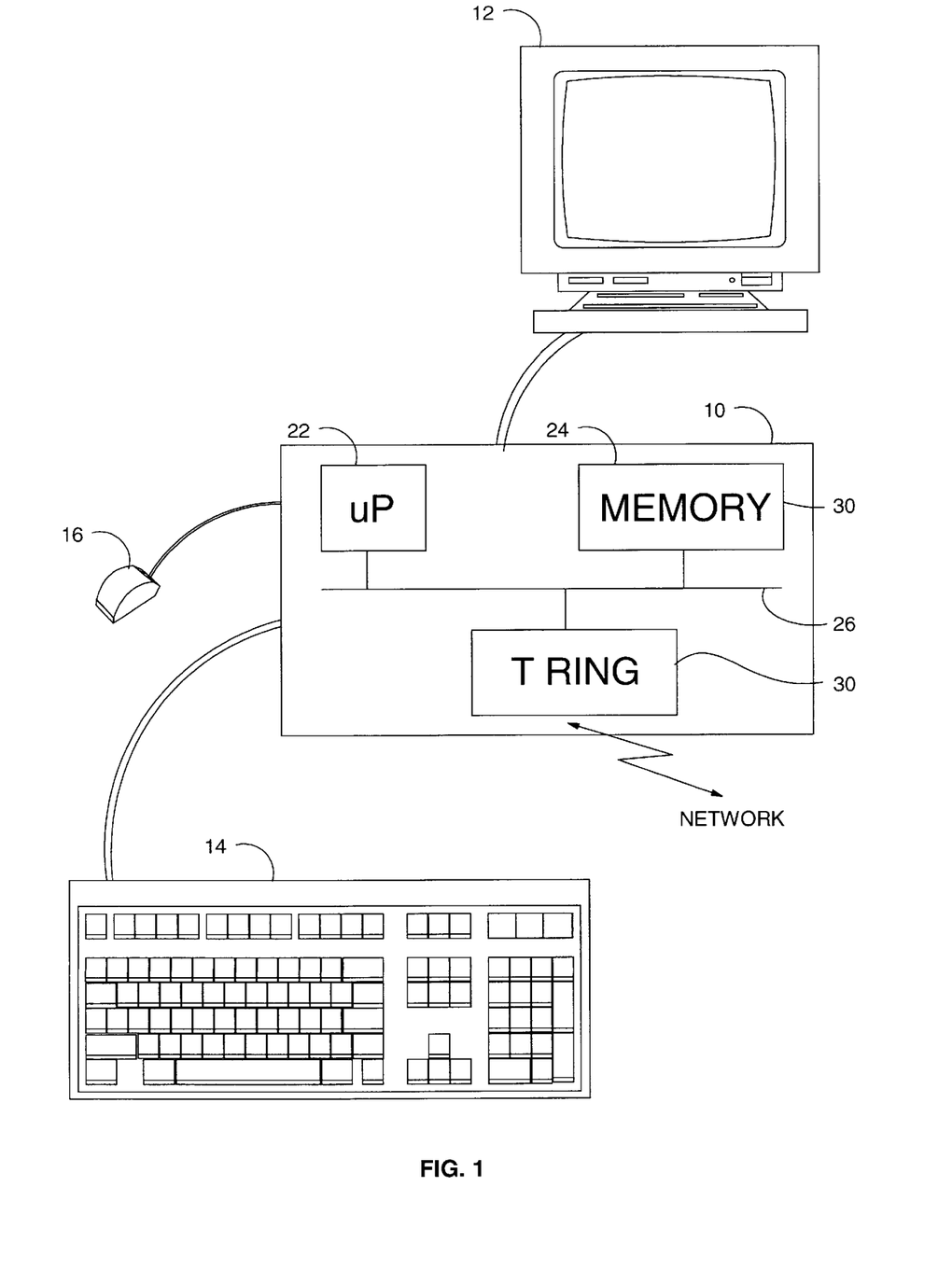
FIG. 1 is a simplified diagram of a typical computer workstation.

FIG. 1 is a simplified schematic diagram of a computer system, with a system unit 10, a display screen 12, a keyboard 14 and a mouse 16. The system unit 10 includes microprocessor 22, semi-conductor memory (ROM/RAM) 24, and a bus over which data is transferred 26. The computer of FIG. 1 may be any conventional workstation, such as a PS/2 computer available from IBM Corporation. The computer of FIG. 1 is equipped with a network adapter card 30. This card, together with the accompanying software, allows messages to be transmitted from and received by the computer workstation. Various forms of network adapter card are available for use with different networks, such as Token Ring, Ethernet, ISDN, and so on. The operation of the network adapter card is well-known and so will not be described in detail.

Figure 2:
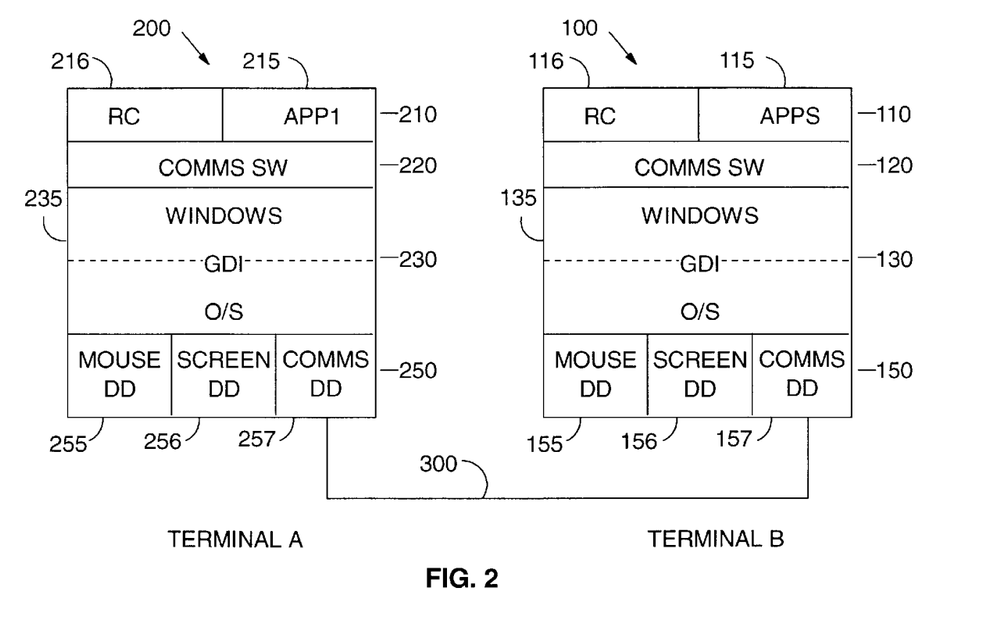
FIG. 2 is a schematic diagram of the main software components utilised in implementing the present invention.

FIG. 2 illustrates the main software components on two terminals, A and B that are involved in a remote control session. Each terminal represents a computer workstation 100, 200 as illustrated in FIG. 1, and runs the Windows operating system 130, 230, available from Microsoft Corporation (strictly speaking of course, the operating system is DOS with Windows running on top of it, but this distinction is not relevant for the present invention). More details about the Windows system can be found in "Programming Windows" by Charles Petzold, from Microsoft Press.

Below the operating systems are device drivers 150, 250, which control interactions between the operating system and external devices attached to the computer. Three particular device drivers are illustrated for each workstation. The first is the mouse device driver 155, 255, which passes to the operating system information received from the mouse 16 relating to location of the mouse, and which buttons are being pushed. The screen device driver 156, 256 is used by the operating system to display images on the display screen 12. Finally the communications device driver 157, 257 is used as an interface between the operating system and the network adapter card 30. It will be appreciated that device drivers are well-known in the art, and so will not be described in further detail. Similarly, there may well be other device drivers (eg one relating to the keyboard 14), but these have been omitted since they are not directly relevant for an understanding of the present invention.

Each terminal also includes communications software 120, 220, which allows messages to be transmitted over link 300 between the computers (via the communications device drivers). Again, such messaging software is well-known in the art, and so will not be described further. Lastly, there are applications 110, 210 running at each workstation. One particular application, illustrated as RC 116, 216, provides a remote control facility, whereby one of the computer workstations in FIG. 2 can be used to remotely operate or control the other workstation. For present purposes, we shall assume that the user is located at terminal B, and is remotely controlling terminal A. In particular, the user at terminal B is controlling the remaining applications 216 (other than RC) at terminal A. For the sake of simplicity, only one application APP1 is illustrated at terminal A, but the remote control facility can in fact handle multiple applications at terminal A. There may also be applications (Apps) 115 other than RC active at terminal B, but these are not directly relevant to an understanding of the present invention.

Figure 3A:
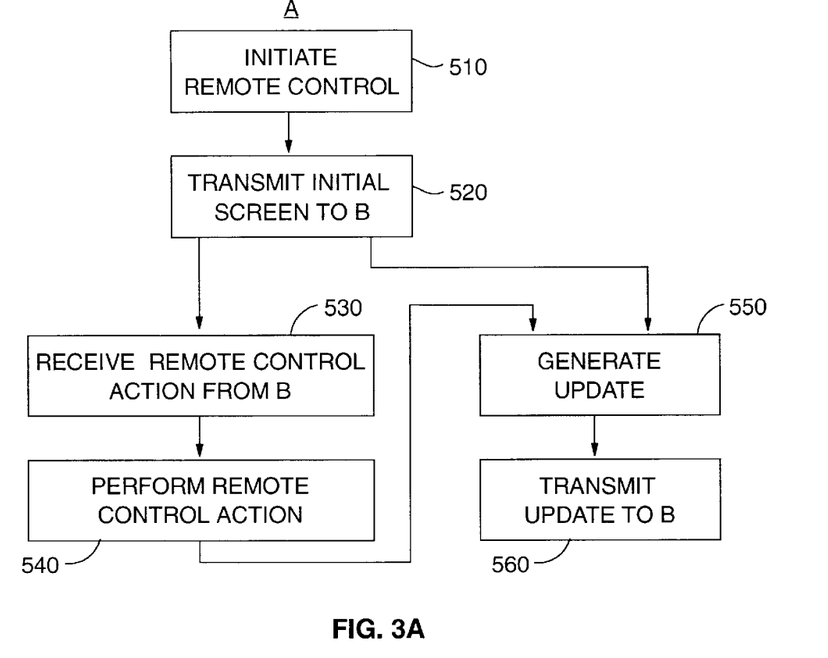
FIGS. 3A and 3B are flow charts illustrating the general operation of remote control.
Figure 3B:
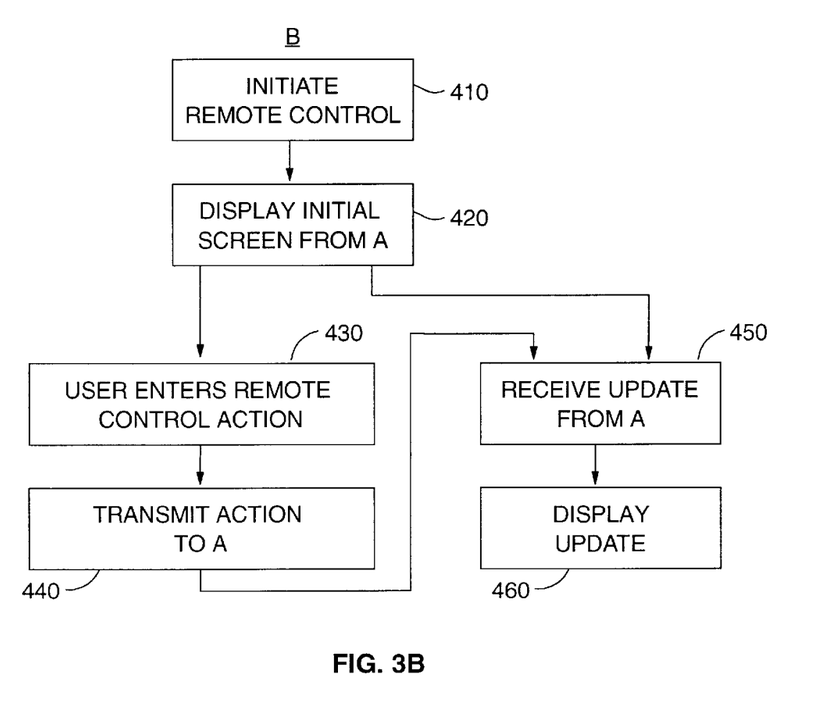

The general operation of remote control is illustrated in FIGS. 3A and 3B, which depict the occurrences at terminals A and B respectively. The first action at both locations is to initiate the remote control application (steps 410, 510). This involves setting up a communications channel between the two terminals etc. As part of this initialisation, the entire screen of terminal A is transmitted from terminal A to terminal B (step 520), where it is displayed (step 420), typically in a remote control window. Remote control can now commence, with the user entering a remote control action at B (step 430). This is then transmitted to terminal A (step 440), where it is received (step 530), and duly performed on the remotely controlled application (step 540). Assuming that this results in the generation of an update to the screen of terminal A (step 550), this update is then transmitted from terminal A to terminal B (step 560), where it is duly received (step 450), and the remote control window depicting the screen at A is updated accordingly (step 460).

Note that an update may be generated at terminal A without the need for any specific action from terminal B. A typical example of this would be if APP1 displayed a clock on the screen at terminal A. Thus each time the hands of the clock moved, an update would automatically be generated at terminal A (step 550), and then transmitted across to terminal B, where it is received and displayed (steps 450, 460). Thus at terminal A the generation of updates and their transmission to terminal B can occur asynchronously with respect to the receipt of remote control actions from terminal B. Similarly, the receipt and display of an update at terminal B can occur asynchronously with respect to the transmission of remote control command to terminal A.

Figure 4:
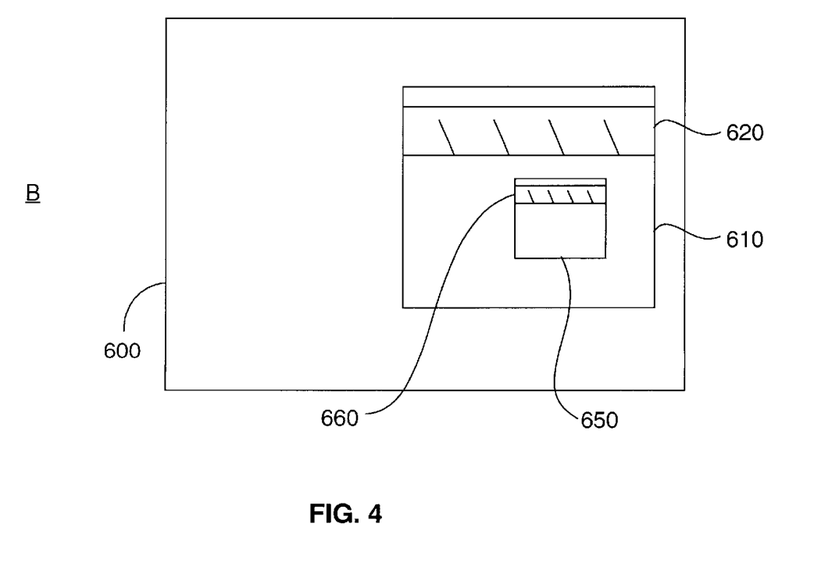
FIG. 4 is a simplified diagram of the screen of a computer workstation from which remote control is being performed.

FIG. 4 illustrates the screen 600 at terminal B, which includes a remote control window 610. The Windows operating system is aware of the location of this window, and certain user actions are then processed automatically by the Windows system, for example clicking on an action bar 620 may result in a menu being displayed. However, when a window 650 from terminal A is displayed at terminal B (within the remote control window 610), the Windows system at terminal B is unaware that it is a window, and simply regards it as part of the bit map displayed within the remote control window.

It will be appreciated that when terminal B displays the entire screen from terminal A in a window 610, some reduction in size is necessary. Two approaches are possible; either the entire screen can be scaled down to fit in the available window size (the Windows operating system can perform this function directly), or else the window at terminal B may display only a part of the screen from terminal A. A scrolling action within this window can then be provided to allow access to the other parts of the screen. In either case, as explained above the screen from terminal A is simply displayed as a bit map.

Progressing onto remote control operation itself, the user at terminal B may decide to perform some mouse action, for example clicking the mouse button on the action bar 660 within window 650. As explained in the preceding paragraph, the Windows system at terminal B is unaware of the presence of action bar 660, so it simply reports the mouse click event to the remote control application 116, which is associated with window 610, representing the location of the mouse click. The remote control application now produces a message which includes the location of the mouse click, which is sent to the remote control application at terminal A using standard communication procedures.

On receipt of this message, the remote control application 216 at terminal A then simulates the equivalent event occurring at terminal A. It does this by using the interface between the Windows system and the mouse device driver. Thus the remote control application calls the entrypoint to the Windows system that the mouse device driver would normally use to inform the Windows system that a mouse event has occurred. In other words, the remote control application is effectively pretending to be the mouse device driver. It therefore informs the Windows system that a mouse action has occurred, with the nature and location of the mouse action corresponding to the action performed by the user within the remote control window at terminal B. The Windows system then passes this mouse event onto the application APP1 responsible for window 650 (unless of course it is an action bar event or similar, which as described above is handled directly by the Windows system at terminal A).

Turning now to the processing of an update at terminal A, as shown in FIG. 3A a screen update can occur either in response to a command received from terminal B via remote control, or simply due to processing at terminal A (such as the operation of a clock at terminal A). It is then necessary to determine which region of the screen has been updated. The technique used will only be outlined, since it is essentially the same as described in EPA-590817 (IBM docket uk9-92-033), which is incorporated by reference herein. The method exploits the interface between the operating system and the screen device driver, which is indicated schematically in FIG. 2 as the Graphical Device Interface (GDI) 135, 235. The Windows system uses GDI calls to write to the screen (the GDI calls in Windows are equivalent to the GPI calls for OS/2 in the above-mentioned patent application). Effectively, the remote control application intercepts these GDI calls, and uses them to determine the region of the screen which is being updated. The call is then forwarded onto the device driver to allow the requested update to be performed, whilst the remote control application obtains a record of the region of the screen that is changed by the update. In the current implementation, this region is always described as a bounding rectangle, which as explained in EPA-590817, turns out to be very efficient for most applications (although more complicated descriptions of the update area, such as circles or polygons, convex or concave, could be used instead if so desired).

The advantage of the above technique for determining updated regions is that it is transparent to the application and operating system, and thus is suitable for general use. However, an alternative approach would be for the application itself to calculate updated regions, and then supply this information direct to the remote control application, although clearly this would require a specially adapted application.

Figure 5:
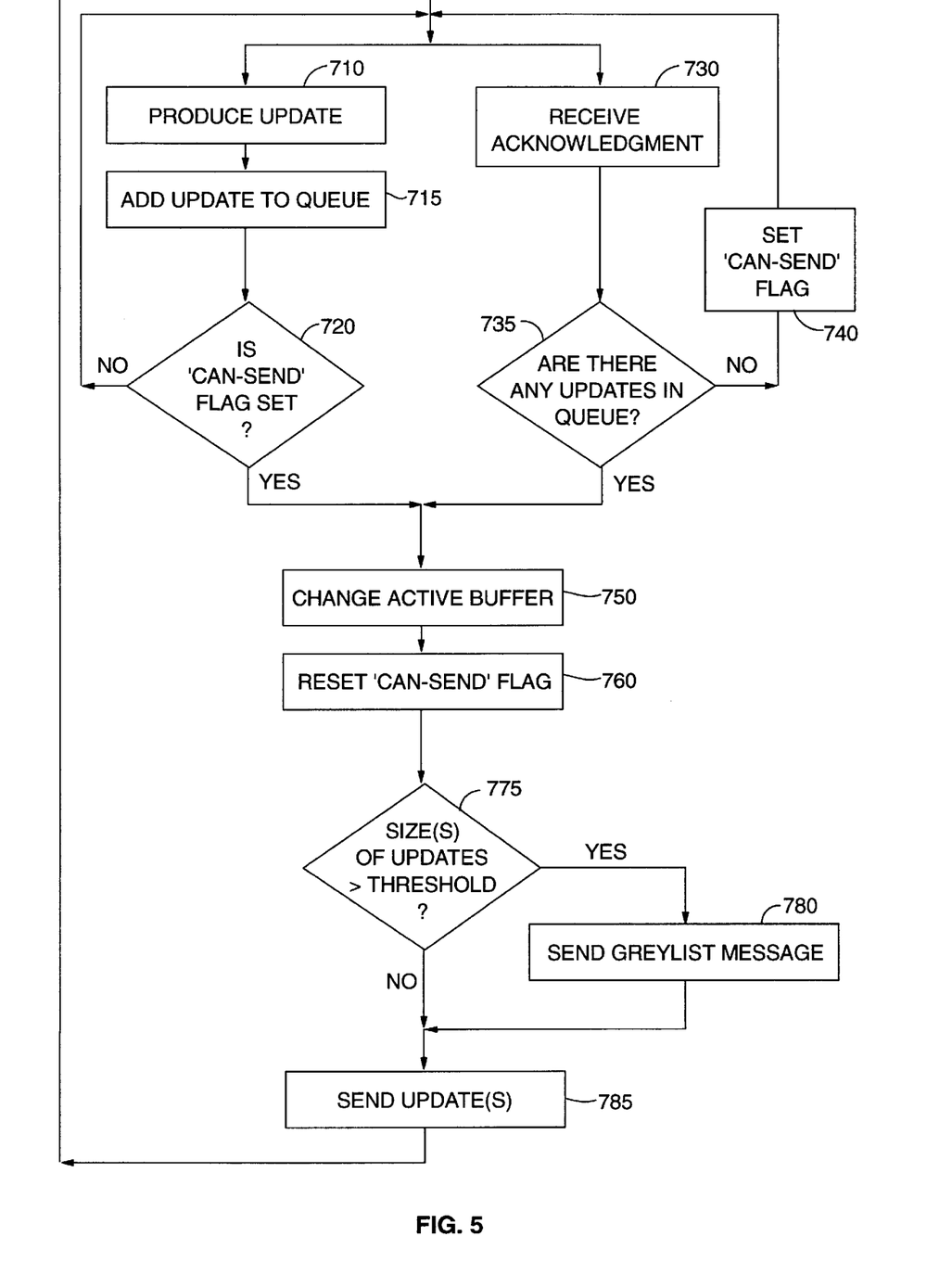
FIG. 5 is a flow chart illustrating the processing of updates at a remote terminal.

The processing of updates at terminal A is shown in FIG. 5. After the update has been generated (step 710), either in response to a remote control command or simply by APP1 itself, it is added to a queue of updates waiting for transmission to terminal B (step 715). A test is performed to determine the status of a "CAN_SEND" flag (step 720), which indicates whether there are any outstanding transmissions of updates which have yet to be acknowledged. If the "CAN_SEND" flag is set, then a transmission can be performed (see below), otherwise, the process must wait for receipt of an acknowledgement from a previous transmission. The receipt of such an acknowledgement is shown as step 730, and this is followed by a test (step 735) to determine whether there are any updates currently in the queue. If not, the "CAN_SEND" flag is set (step 740), thereby allowing the transmission of any future updates when they are generated.

The actual transmission of updates from the queue is shown in steps 750 to 785, and is essentially the same whether the transmission is triggered by the production of a new update (ie via step 710), or by the receipt of an acknowledgement (step 730) (nb the receipt of acknowledgements and the production of updates occur effectively asynchronously with respect to one another). The queue is divided into two buffers, one of which is designated as the "active" buffer at any particular time (for present purposes the other buffer can be referred to as the "sending" buffer). New updates are added (step 715) to whichever buffer is currently active. The transmission process starts with changing (swapping) the active buffer (step 750), so that that the previously active buffer becomes the sending buffer, whilst the other buffer becomes the active buffer to which new updates are added. Also, the "CAN_SEND" flag is reset (unset) to indicate that a transmission is in progress (step 760) (nb it may already be reset). A test is then performed for each update in the sending buffer to determine whether the update meets predetermined criteria (775), which relate to how long it will take to transmit the update from terminal A to terminal B. For updates which are likely to require a relatively long time, an initial message (a "greylist" message) is sent first to terminal B (step 780). The greylist message simply indicates to which region of the screen the update or updates applies. As explained above, all updates are processed in terms of their bounding rectangles, so that the greylist message only needs to include two coordinates (the top left and bottom right corners of the rectangle in the present implementation). It will be appreciated that size of the greylist message is therefore independent of the size of the actual update. It is always very small and so can be transmitted quickly. In the present implementation a single greylist message is sent which contains the bounding rectangles for all the updates in the sending buffer that do not meet the predetermined criteria, since this is generally more efficient than sending lots of very small greylist messages separately (although certainly it would be possible to send all the greylist messages individually). Note that even if the greylist message relates to several updates, it is still very small in size.

Once the greylist message has been transmitted (or immediately after the test of step 775 if there is no greylist message to send), the updates themselves can be transmitted to terminal B (step 785). The step of sending the updates represents removing all the updates from the sending buffer and passing them to the communications software, which can be done relatively quickly. The communications software is then responsible for their actual transmission to terminal B. Unlike with the greylist message, the updates from a sending buffer are maintained in separate messages for sending (this can be done on a simple FIFO basis, irrespective of which updates have been included in the greylist packet), although one might consider as an alternative aggregating all the updates in a sending buffer into a single message.

It will be appreciated that the addition of an update to the queue (step 715) includes checking the region changed by that update against others in the queue. Updates which are wholly contained inside another update are deleted, whilst updates which overlap or are close together are replaced by a single update. In practice this action significantly reduces the number of updates to send. It will also be understood that the updates stored in the queue simply indicate the region of the screen that has been updated; in the present implementation the top left and bottom right hand corners of the bounding rectangle for the update are stored. The actual screen data associated with an update is not obtained (via a request to the Windows system) until the update is being prepared for transmission (step 785). This avoids the need to store large quantities of data in the queue, and also makes the deletion or merging of updates in the queue much simpler.

The predetermined criteria regarding whether or not to send a greylist message for any particular update relate to the expected delay resulting from the processing and transmission of the update. In the current implementation the test is very simple, being based on the area of the update. For example, all updates having an area greater than a threshhold of say 200 pixels have a greylist message sent prior to transmission of the update itself. However, a much more sophisticated test could be employed, making allowance for example for any data compression to be performed. Other aspects which might also be taken into consideration include processor loading (which will affect the time required for any format conversion or compression of the update), and network bandwidth and current network traffic (which will affect the transmission time). For example, if the network has a relatively low bandwidth, then it may be desirable to decrease the above mentioned threshhold to a lower number of pixels.

Figure 6:
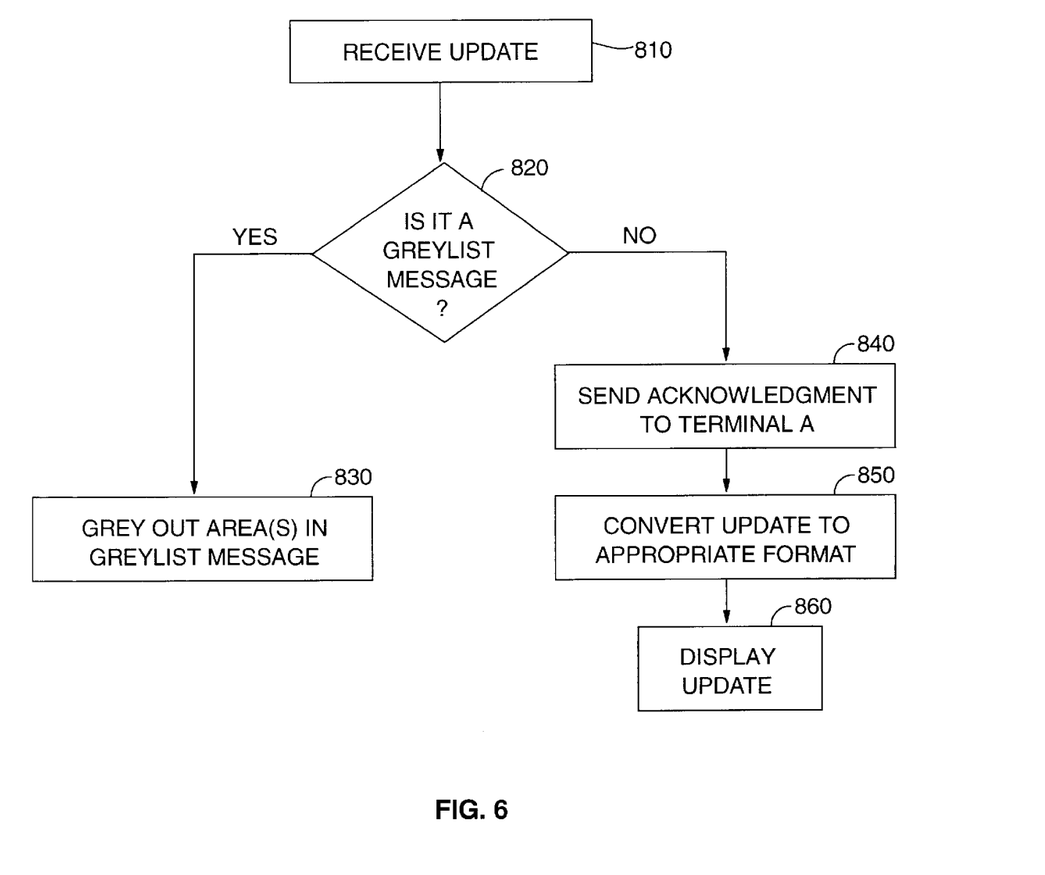
FIG. 6 is a flow chart illustrating the processing of updates at the computer workstation from which remote control is being performed.

The processing of an update message received at terminal B is depicted in FIG. 6. After the update has arrived at terminal B (810), it is examined (820) to see whether or not it is a greylist message (ie contains only an indication of a region to be updated rather than the updated screen data itself). If so, then the information indicating the extent of the updated region is utilised by means of a PatBlt call to the Windows system in order to visually mark the updated region (the PatBlt call is described in detail in the above-mentioned book by Petzold). This call fills the specified region of screen (830), ie the region of the remote control window that is to be updated, with an application-provided pattern (the pattern is repeated as many times as is necessary to fill up the specified region). In the current implementation, the pattern comprises an arrangement of grey dots. This operation is very fast, and results in selected pixels in the specified region being overwritten by grey dots, the overall effect being a greying (cross-hatching) of the specified region. In this manner, the user is informed that the greyed area of the screen is in the process of being updated, any delay being primarily due to the time required to process and transmit the data from the remote machine (terminal A) to the local machine (terminal B). The parameters of the PatBlt call are specified such that the pattern of grey dots is superimposed on the original screen data. As a consequence of this, the original data is still substantially visible inbetween the dots.

As explained earlier, the greylist packet may in fact contain information (sets of coordinates) relating to several updates; in this case, for each update a PatBlt call is made to grey out the appropriate region for that update.

If on the other hand the received message represents actual update data, then an acknowledgement is returned to terminal A (step 840). Note that no acknowledgement is sent for greylist messages since as explained in more detail below, no acknowledgement is requested. The update is then queued for application to the screen (if multiple updates had been aggregated into a single message, they would be disaggregated here for insertion into the queue, although as previously noted in the present implementation the updates are sent individually). A certain amount of processing is required for each update to convert it into a form suitable for display at the terminal (step 850). Thus in the present implementation, the update data is converted into Device Independent Bit-Map (DIB) format at the transmitting terminal, and then converted back to an appropriate display format at the receiving terminal (although it would in fact be possible to display the DIB format directly). The reason for using DIB format is that it overcomes any hardware differences between terminals A and B (eg in relation to the number of supported colours). Similarly, it may be necessary to decompress the update (although the communications software may already have done this). In the present application the actual updates are compressed for transmission between the remote and local terminal using the technique described in UK patent application 9422856.6 (IBM docket UK9-94-050), although many other data compression algorithms would be suitable (likewise in some situations it may be appropriate not to use any compression at all).

Once the update has been converted into an appropriate format, it is then applied to the screen (step 860) using a BitBlt command (another standard command in the Windows system, which is described further in the above-mentioned Petzold reference). Note that since the BitBlt operation will simply overwrite the update to the relevant region of the screen, there is no need to explicitly delete any grey pattern used to indicate the update region prior to the arrival of the update itself.

It will be appreciated that for both the BitBlt and the PatBlt operations it is necessary to transform from the coordinates of terminal A to those of the window of terminal B. The inverse conversion is obviously required for example for reporting remote control actions back from terminal B to terminal A. In practice this is very straightforward, since the remote control window at terminal B (ie corresponding to window 610 in FIG. 4) generally has its origin in the top left corner, and this can then be made to correspond directly with the screen coordinates at terminal A.

The use of acknowledgements described above simply acts as a control mechanism to prevent terminal B from becoming overloaded with updates to process and display. In other words, the acknowledgements are effectively used to control the "CAN_SEND" flag at terminal A, to indicate that terminal B has finished processing the previous update, and is therefore ready to accept another update transmission. Note however, that as shown in FIG. 6, no acknowledgement is generated with respect to any greylist message. An acknowledgement is produced at the request of the transmitting terminal; for greylist messages no such request is made. This is because the greylist message can be processed very quickly at B and thus does not represent a significant load on the system.

Figure 7A:
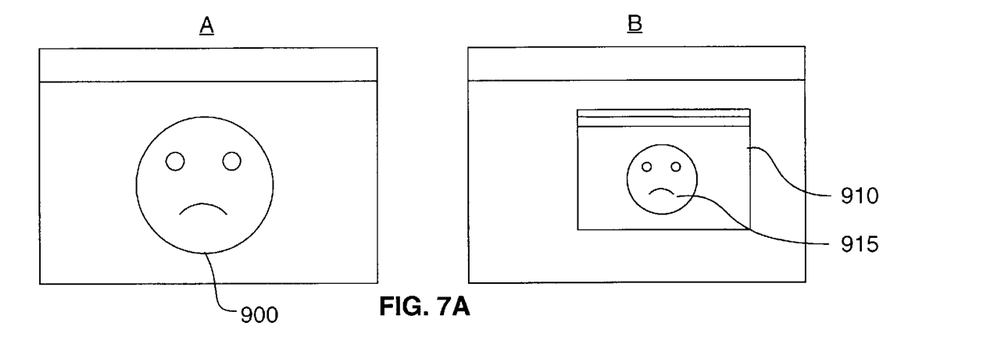
FIGS. 7a, 7b, 7c and 7d illustrate an example of a remote control operation.

An example of a simple remote control command is shown in FIGS. 7a–d. Initially an application at terminal A displays a face 900 (FIG. 7a). Terminal A is being remotely controlled from terminal B, so that the same image of a face 915 is also displayed within the remote control window 910 at terminal B (the Windows system takes care of the reduction in size of the face image to fit inside window 910). Also indicated at point 915 at terminal B is a cursor position. Assuming that the user at terminal B performs some mouse action, such a clicking a button, then as described previously, this is transmitted back and implemented at terminal A.

Figure 7B:
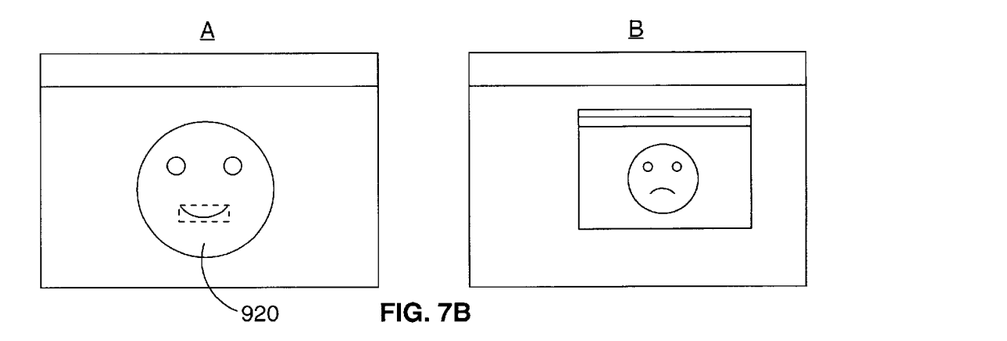

It is assumed that the mouse action results in the application at A changing the shape of the mouth from a sad shape to a smile. As a result, the screen image at terminal A is updated, as shown in FIG. 7b. Also shown in FIG. 7b is the bounding rectangle, 920 for this update (of course the bounding rectangle does not actually appear on the screen at terminal A). At this stage terminal B has not been updated.

Figure 7C:
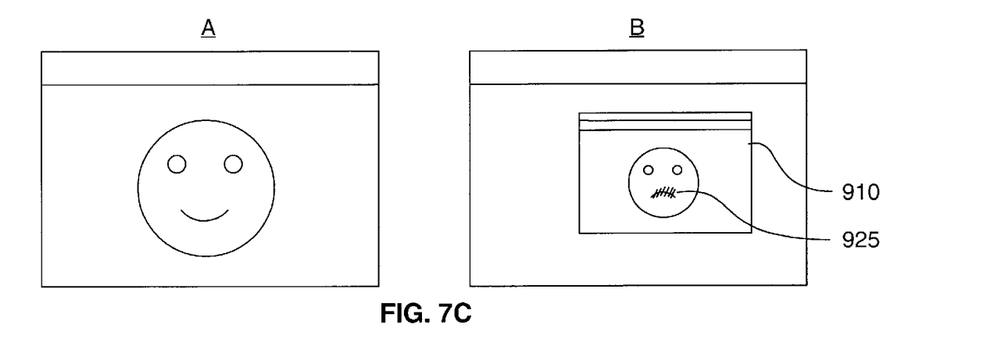
Figure 7D:
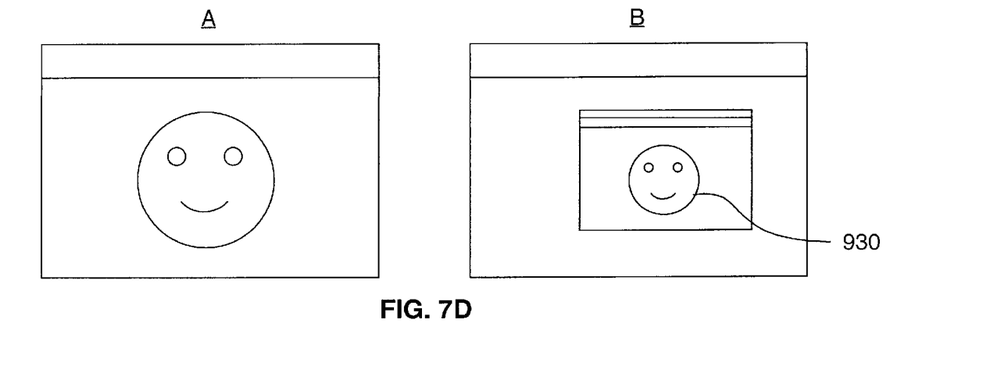

As a result of the update to terminal A, as described above a test is performed on the bounding rectangle to determine whether its size exceeds a predetermined threshhold, and assuming that it does this results in the transmission from terminal A to terminal B of firstly a greylist packet, and secondly the actual update data. FIG. 7c shows the situation at terminal B after the arrival of the greylist packet, but before arrival of the update data. The region 925 of window 910 corresponding to bounding rectangle 920 has been greyed (depicted as shading in FIG. 7c for ease of representation). This assures the user at terminal B that their action has been received and is being processed, and also provides a rough indication of the delay likely before the action can be completed (the larger the shaded area, the greater the update to be sent and the longer the likely delay). Finally, as shown in FIG. 7d, the full update has arrived and has been applied to the screen at terminal B, so that the face 930 at terminal B is once more the same as at terminal A. Note that typically the time interval between FIGS. 7a and 7c is generally relatively short, thereby providing quick feedback to the user, whereas the interval between 7c and 7d may be quite large, depending on the size of the update involved. For example, in a typical environment, it may take a couple of seconds from the initial command for the update itself to be applied to terminal B, whereas the greying can be performed within a fraction of a second.

In practice the generation of updates is generally found to be rather clustered, so that typically a large number of updates are generated by one or more user actions, and this is followed by a lull with very few updates as the user pauses for thought. The transmission of updates to the other terminal often falls behind when the updates are being generated quickly, but can then catch up during the lull.

Although the information concerning the extent of an update has been referred to as a "greylist" message, because the receiving terminal greys out the relevant portion of the screen, in fact any other technique for providing a clear visual indication of the relevant portion of the screen could be used. Some possibilities for example would be to mark the area to be updated with diagonal striping, to surround the region to be updated with a bright frame, or to alter the background colour of the region to be updated. Note that these suggestions are all quick to draw to the screen, and all retain the advantage that the user can still see the underlying screen display (at least partially) until arrival of the updated data. Furthermore, since the marking is contained within the region of the update, it is automatically overwritten when the update itself arrives, so that there is no need to specifically delete the marking.

It should be appreciated that the messages described above represent messages as passed from the transmitting remote control application to the communications software. Depending on the network characteristics, message size, and so on, the communications software may decide to split any message into smaller components, or to combine the message with other messages into a single packet for transmission. The receiving communications software then performs the converse operations, in order to pass the received messages separately to the receiving remote control application. Thus the format selected by the communications software for message transmission is transparent to the remote control applications, and has no direct bearing on the present invention.

It should be noted that whilst the remote control facility has been described with reference to two terminals (known as "point to point") for ease of understanding, the present implementation in fact allows the remotely controlled screen to be viewed from multiple other terminals (referred to as "multipoint"). The extension from point to point to multipoint is primarily performed by the communications software, which directs the greylist packets and updates to all the relevant terminals. The acknowledgement used to control the processing of updates (see FIG. 5) is currently based on an acknowledgement from the first terminal to receive an update, but it may perhaps in some circumstances be better to wait for the acknowledgement from the last terminal to receive the update. Furthermore, although the invention has primarily been described in relation to a remote control facility, it is equally applicable in many other situations, for example where a selected application or window from one machine is simply to be displayed (mirrored) at other terminals.

We claim:

1. A method of operating a computer workstation which is interconnected to a remote computer workstation via a communications link with each workstation having a display screen, said method comprising the steps of:

generating data constituting an update to the display screen of said computer workstation;

transmitting an indication to said remote workstation that an update has been generated for said computer workstation;

automatically after said step of transmitting an indication, separately transmitting said data representing the update to the remote workstation after transmitting said indication;

determining the region of the remote display screen to be updated and including in said indication an identification of said region; and first comparing said update against data representing predetermined criteria and if such criteria has been satisfied, transmitting the update directly to said remote workstation without transmitting said indication.

2. The method of claim 1, wherein said predetermined criteria relate to the size of updated region.

3. A method of operating a computer workstation having a display screen with said workstation being linked to a remote workstation having a display screen in which at least part of the screen of said workstation is arranged to correspond to at least part of the screen of said remote workstation, the method comprising the steps of:

receiving a first message from the remote workstation at said computer workstation indicating a region of the display screen of the remote workstation to which an update has been applied;

denoting visually a region of the workstation display screen, with said denoted region corresponding to the part of the remote workstation display screen to which said update has been applied, thereby indicating to the user that the visually denoted region of the workstation display screen no longer matches the corresponding part of the remote workstation display;

receiving a second message from the remote workstation at said computer workstation containing the image data for the update made to the remote workstation, said second message being received automatically after said first message, without said workstation having to send any request to the remote workstation; and applying said update to said workstation at said denoted region of the display screen, whereafter said region is no longer visually denoted.

4. The method of claim 3 further comprising the step of visually denoting said region without inhibiting the original image at that region such that the original image remains substantially visible.

5. The method of claim 3, wherein the step of visually denoting a region comprises greying out the relevant region.

6. The method of claim 3, wherein the step of visually denoting a region comprises reversing the background color or stripping the relevant region.

7. The method of claim 3, wherein a plurality of updates are generated with each update processed in terms of its bounding rectangle.

8. The method of claim 3, further comprising the step of initially sending a command to the remote workstation, whereby said update is applied at said remote workstation in response to said command.

9. A computer workstation which is interconnected to a remote computer workstation via a communications link with each workstation having a display screen in which at least part of the screen of said workstation is arranged to correspond to at least part of the screen of said remote workstation, said workstation comprising:

means for receiving a first message from the remote workstation indicating a region of the screen of the remote workstation to which an update has been applied;

means for denoting visually a region of the workstation screen, said denoted region corresponding to the part of the remote workstation screen to which said update has been applied, thereby indicating to the user that the visually denoted region of the workstation display screen no longer matches the corresponding part of the remote workstation display;

means for receiving a second message from the remote workstation containing the image data for the update made to the remote workstation, said second message being received automatically after said first message, without said workstation having to send any request to the remote workstation; and means for applying at said workstation said update to said denoted region of the screen, whereafter said region is no longer visually denoted.

10. A method of mirroring at least part of a display screen from a remote workstation on a display screen of a local workstation, whereby updates applied to the screen of the remote workstation are correspondingly applied to the local workstation, said method comprising the steps of:

applying an update to the screen of the remote workstation;

determining the updated region in the display screen of the remote workstation;

transmitting from the remote workstation an indication of the region being updated to the local workstation;

receiving said indication at the local workstation;

denoting visually a region of the local workstation screen, said denoted region corresponding to the indicated region of the remote workstation screen to which said update has been applied, thereby indicating to the user that the visually denoted region of the workstation display screen no longer mirrors the corresponding part of the remote workstation display;

automatically after said step of transmitting an indication, separately transmitting from the remote workstation to the local workstation the data representing the update applied to the screen;

receiving said update at the local workstation; and applying said update to said denoted region of the screen at the local workstation, whereafter said region is no longer visually denoted.

11. The method of claim 10, further comprising the step of comparing an update against data representing predetermined criteria and if such criteria is satisfied, transmitting the update directly to said remote workstation without transmitting said indication.

12. The method of claim 11, wherein said predetermined criteria relate to the size of updated region.

13. The method of claim 10, wherein a plurality of updates are generated with each update processed in terms of its bounding rectangle.

14. The method of claim 10, further comprising the step of visually denoting a region without inhibiting the original image at that region such that the original image remains substantially visible.

15. The method of claim 14, wherein the step of visually denoting a region comprises greying out the relevant region.

16. The method of claim 14, wherein the step of visually denoting a region comprises reversing the background color or stripping the relevant region.

17. The method of claim 10, further comprising the step of initially sending a command from said local workstation to the remote workstation, whereby said update is applied at said remote workstation in response to said command.

18. The method of claim 17, wherein said command is sent from said local workstation to the remote workstation in order for a user at the local workstation to perform remote control of said remote workstation.

* * * * *